United States Patent
Clarke et al.

(10) Patent No.: US 10,279,295 B2
(45) Date of Patent: *May 7, 2019

(54) METHODS, APPARATUS AND PRODUCTS FOR FILTERING

(75) Inventors: Alan L Clarke, Mineral Wells, TX (US); John W. Clarke, Graham, TX (US); Timothy J Chisholm, Breckenridge, TX (US)

(73) Assignee: FILTRATION GROUP CORPORATION, Joliet, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/396,570

(22) Filed: Mar. 3, 2009

(65) Prior Publication Data

US 2010/0224065 A1    Sep. 9, 2010

(51) Int. Cl.
*B01D 46/00* (2006.01)
*B01D 46/24* (2006.01)

(52) U.S. Cl.
CPC ....... *B01D 46/008* (2013.01); *B01D 46/0024* (2013.01); *B01D 46/2411* (2013.01); *B01D 2265/022* (2013.01); *B01D 2265/023* (2013.01); *B01D 2265/028* (2013.01)

(58) Field of Classification Search
CPC ...... B01D 21/00–21/003; B01D 46/02–46/26; B01D 46/008; B01D 46/0024; B01D 46/2411; B01D 46/12; B01D 2265/022; B01D 2265/023; B01D 2265/028
USPC ......... 210/300, 314–318, 322–347, DIG. 17; 95/228–233, 281–282; 55/341.1–341.7, 55/350.1, 422, 482–519, 323, 332, 336
See application file for complete search history.

(56) References Cited

U.S. PATENT DOCUMENTS

| | | | | |
|---|---|---|---|---|
| 905,999 | A * | 12/1908 | Emerson | 96/233 |
| 2,528,539 | A * | 11/1950 | Norgren et al. | 96/117.5 |
| 3,032,403 | A * | 5/1962 | Kohl | 422/259 |
| 4,243,536 | A * | 1/1981 | Prolss | 210/321.84 |
| 4,259,097 | A * | 3/1981 | Patel et al. | 96/136 |
| 4,509,960 | A * | 4/1985 | Engel | 55/287 |
| 5,069,799 | A * | 12/1991 | Brownawell et al. | 210/749 |
| 5,126,043 | A * | 6/1992 | Giordano et al. | 210/249 |
| 5,178,753 | A * | 1/1993 | Trabold | 210/130 |
| 5,571,299 | A * | 11/1996 | Tonn | 55/302 |
| 5,723,044 | A * | 3/1998 | Gleason et al. | 210/170.09 |
| 6,029,479 | A * | 2/2000 | Pattee | 68/18 F |
| 6,168,647 | B1 * | 1/2001 | Perry et al. | 95/19 |
| 6,187,073 | B1 * | 2/2001 | Gieseke et al. | 55/485 |
| 6,302,932 | B1 * | 10/2001 | Unger et al. | 55/306 |
| 7,296,402 | B1 * | 11/2007 | Cook | 60/295 |
| 7,650,805 | B2 * | 1/2010 | Nauseda et al. | 73/865.9 |
| 2003/0106847 | A1 * | 6/2003 | Sann et al. | 210/130 |
| 2005/0205484 | A1 * | 9/2005 | Diel | 210/323.1 |
| 2006/0065601 | A1 * | 3/2006 | Baird | 210/652 |
| 2007/0034559 | A1 * | 2/2007 | Beard et al. | 210/203 |

(Continued)

*Primary Examiner* — T. Bennett McKenzie
(74) *Attorney, Agent, or Firm* — Gilbreth & Associates, PC; J. M. (Mark) Gilbreth

(57) ABSTRACT

A device for filtering a gas stream, having a vessel partitioned into a first stage and a second stage, with an opening between stages. A filter element is positioned in the opening, with ends of the filter element extending into the first and second stages. The first member is removable from the second member while the filter element is positioned in the opening, to allow for replacement with a new clean member.

15 Claims, 5 Drawing Sheets

(56) References Cited

U.S. PATENT DOCUMENTS

2009/0007787 A1\* 1/2009 Wright ................ B01D 53/268
96/4
2010/0140177 A1\* 6/2010 Diemer et al. ................ 210/663

\* cited by examiner

METHODS, APPARATUS AND PRODUCTS FOR FILTERING

BACKGROUND OF THE INVENTION

1. Field of the Invention

The present invention relates to methods, apparatus and products for filtering. In another aspect, the present invention relates to methods, apparatus and products for filtering streams of gas and/or liquids to remove solids and/or entrained liquids. In even another aspect, the present invention relates to methods, apparatus and products for filtering, utilizing a filter system in which that portion of the filter system more likely to accumulate filtrate is replaceable apart from that portion of the filter system which is less likely to accumulate filtrate. In even another aspect, the present invention relates to methods, apparatus and products for filtering, utilizing a two stage filter system in which that portion of the filter system in the first stage is more likely to accumulate filtrate is replaceable apart from that portion of the filter system in the second stage which is less likely to accumulate filtrate.

2. Brief Description of the Related Art

There are a number of applications in which it is necessary to remove solids or liquids from a gas stream, liquid stream, or multi-phase stream. As a non-limiting example, solid or liquid contaminants may be present in various gas or liquid streams of a refrigeration system. As another non-limiting example, gas pipelines many times contain solid or liquid contaminants.

Various apparatus and methods for removing solids and/or liquids from gas streams are well known. Quite commonly, gas filter elements are utilized for filtering dry gas streams as well as for separating solids and liquids from contaminated gas streams, or for coalescing entrained liquids from a gas stream. Often these types of gas filter elements are installed in multi-stage vessels, which are in turn installed in a gas pipeline, to perform these filtering functions.

There are a number of patents that relate to removing solids and/or liquids from gas streams, the follow of which are merely a small sampling.

U.S. Pat. No. 6,381,983, issued May 7, 2002, to Angelo et al., discloses an improved filter drier for a refrigeration system having a replaceable tubular filter element. A desiccant assembly is removably secured within a housing. The assembly includes a first and second molded desiccant, a hollow tubular perforated core located within said first and second molded desiccant, and a tubular filter located over said core.

U.S. Pat. No. 6,692,639, issued Feb. 17, 2004, to Spearman et al., discloses a conically shaped filtration and/or separation apparatus that is constructed from a stack of filters at least some of which are different sizes superposed above each, other, of said plurality of said filters in a fluid communicable relationship. A collapsible version of such conically shaped filter and/or separation apparatus is provided whereby a plurality of such filters are connected together using two piece interlocking or connecting end caps.

U.S. Pat. No. 6,858,067, issued Feb. 22, 2005, to Burns et al., discloses a filtration vessel for use with a rotary screw compressor that receives a compressed liquid/gas mixture from the compressor. The vessel utilizes a first stage vortex knockout region to remove bulk liquids through a circular motion that imposes centrifugal forces on the gas and liquid mixture. A coalescer region located above the vortex knockout region receives the relatively lighter fluids and separates any remaining entrained liquids from the fluids. The discharge from the filtration unit is an essentially liquid free compressed gas. The liquid discharge, in the case of lube oil can be recirculated to the compressor for another cycle.

U.S. Pat. No. 7,051,540, issued May 30, 2006, to TeGrotenhuis et al., discloses a wick-containing apparatus capable of separating fluids and methods of separating fluids.

U.S. Patent Application Publication No. 20070095746, published May 3, 2007 to Minichello et al., discloses an apparatus for filtering a gas or liquid stream such as a natural gas stream. The apparatus includes a closed vessel having a longitudinally extending length, an initially open interior, an inlet port at one extent and an outlet port at an opposite extent thereof. A partition located within the vessel interior divides the vessel interior into a first chamber and a second chamber. At least one opening is provided in the partition. A filter element is disposed within the vessel to extend from within the first chamber. A special seal structure formed of a resilient material and having conically shaped sidewalls is used to seal against one end of the filter element as well as forming a dynamic seal with the vessel riser in use.

U.S. Pat. No. 7,270,690, issued Sep. 18, 2007, to Sindel, discloses a separator vane assembly made up of a number of corrugated vanes that provide serpentine paths for the gas stream therethrough. As the gas stream flows through the serpentine paths, it changes direction and liquid in the gas stream impacts the surfaces of the vanes. The upstream section of the vane assembly has roughened surfaces to decrease the surface tension of the liquid, thereby causing the liquid to coalesce. The downstream section of the vane assembly has smooth surfaces so as to increase the surface tension of the liquid. The vane assembly is followed by filters, which capture the liquid that passes through the vane assembly. The vane assembly coalesces the liquid to enable the filters to operate more effectively.

U.S. Patent Application Publication No. 20070251876, published Nov. 1, 2007 to Krogue et al., discloses an apparatus for filtering a gas or liquid stream of impurities and to filter elements used in such an apparatus. The apparatus includes a closed vessel having a longitudinally extending length, an initially open interior, an input port at one extent and an output port at an opposite extent thereof. A partition located within the vessel interior divides the vessel interior into a first stage and a second stage. At least one opening is provided in the partition. A filter element is disposed within the vessel to extend from within the first stage. The filter element is made up of a carbon block filter media surrounded by a protective porous depth filter media.

U.S. Pat. No. 7,314,508, issued Jan. 1, 2008, to Evans, discloses a desiccant cartridge having a seal therearound for forming a proper seal between the cartridge and the canister of a receiver/dryer or accumulator assembly includes a cup extending along an axis having inner wall portion and outer wall portion connected to a transverse portion to define a chamber containing desiccant particles. A cap is secured to cup to secure the desiccant particles inside the chamber. The outer wall portion is provided with the seal that is composed of a flexible thermoplastic elastomer that is resistant to heat during welding shut of the canister.

U.S. Pat. No. 7,332,010, issued Feb. 19, 2008, to Steiner, discloses a two or three phase separator including a centrifugal separator, a demister (if a three phase separator), and a filter contained within a housing. The filter uses an outside-in flow principle. The filter includes an inner layer or a center core that defines a hollow interior. An outer layer is positioned adjacent and surrounding the inner layer. The outer layer includes a re-enforcement layer, a first particle filter layer, a coalescer layer, and a second particle filter layer. An access cover of the separator includes a cover plug, an actuator cam, a plurality of idler cam plates, and a plurality of mechanisms. The access cover cooperates with an opening and an annular groove in the housing to close off and seal the separator.

U.S. Pat. No. 7,344,576, issued Mar. 18, 2008, to TeGrotenhuis et al., discloses methods of separating fluids using capillary forces and/or improved conditions. The improved methods may include control of the ratio of gas and liquid Reynolds numbers relative to the Suratman number. Also disclosed are wick-containing, laminated devices that are capable of separating fluids.

Quite commonly in pipeline applications, it is not uncommon to see multi-stage vessels, as well as a multitude of other similar filtration vessels, that utilize solid or hollow core tubular elements, typically formed at least partially a porous filtration media. Non-limiting examples of such vessels include filtration equipment such as shown in U.S. Pat. No. 5,919,284, issued Jul. 6, 1999 or U.S. Pat. No. 6,168,647, issued Jan. 2, 2001, both to Perry, Jr. et al.

U.S. Pat. No. 5,919,284 discloses a gas filter separator coalescer and multi-stage vessel for separating liquids and solids from a gas stream and simultaneously coalescing liquids from the gas stream. The apparatus includes a closed vessel having a longitudinally extending length, an initially open interior, an input port at an extent and an output port at an opposite extent thereof. There is a partition located within the vessel interior that divides the vessel interior into a first stage and a second stage. There is at least one opening in the partition. A separator/coalescer filter element is disposed within the vessel to sealingly extend from within the first stage through the opening into the second stage. There is a chevron-type seal or an O-ring seal between the filter element and the opening. The input port, vessel interior, separator/coalescer filter element and output port together define a flow passage within the apparatus, whereby the gas stream flows into the first stage through the input port and through the filter element hollow core, thereby filtering solids out of the gas stream, separating liquids from the gas stream, and pre-coalescing liquids in the gas stream. The gas stream then flows along the hollow core past the partition and back through the filter element into the second stage, thereby coalescing liquids out of the gas stream, the gas stream then exiting the second stage through the outlet port.

U.S. Pat. No. 6,168,647 discloses an apparatus for separating liquids and solids from a gas stream and simultaneously coalescing liquids from the gas stream. The apparatus includes a closed vessel having a longitudinally extending length, an initially open interior, an input port at an extent and an output port at an opposite extent thereof. There is a partition located within the vessel interior that divides the vessel interior into a first stage and a second stage. There is at least one opening in the partition. A separator/coalescer filter element is disposed within the vessel to sealingly extend from within the first stage through the opening into the second stage. There is a chevron-type seal or an O-ring seal between the filter element and the opening. The input port, vessel interior, separator/coalescer filter element and output port together define a flow passage within the apparatus, whereby the gas stream flows into the first stage through the input port and through the filter element hollow core, thereby filtering solids out of the gas stream, separating liquids from the gas stream, and pre-coalescing liquids in the gas stream. The gas stream then flows along the hollow core past the partition and back through the filter element into the second stage through a louvered impingement baffle, thereby coalescing liquids out of the gas stream, the gas stream then exiting the second stage through the outlet port. The louvered impingement baffle conditions the gas stream to create a scrubbing effect on any fine mist exiting the separator/coalescer filter element.

With such equipment as disclosed in the U.S. Pat. No. 5,919,284 or 6,168,647, it is periodically necessary to perform maintenance on the filtration vessels, including replacement of the porous filter elements. This task is labor intensive and time consuming insitu because of the mounting structure used to mount the filter elements within the filtration vessel interior. Often, it is necessary to unscrew the end cap or nut to free the filter element from its associated structural mounting within the vessel interior. Not only is this time consuming, but the location of the mounting structure is sometimes inconvenient to access, making filter replacement a difficult or inconvenient chore. The same type of inconveniences is present in the initial filter installation process for new filtration vessels.

Specifically for filter systems of the type disclosed in U.S. Pat. No. 6,168,647, there are at least two reasons for the difficulty in removing the filter elements. First, the chevron seal is working against the removal direction when trying to remove the element. Second, since the filter element extends into the riser assembly, solids collect and pack into the riser assembly. Additionally, it is not uncommon to find damage to the downstream expanded metal support grid generally caused by the elements being shoved in too far.

In an effort to overcome the problems of the prior art, especially the deficiencies of U.S. Pat. No. 5,919,284 or 6,168,647, further development was advanced in U.S. Pat. No. 7,014,685, issued Mar. 21, 2006, and U.S. Pat. No. 7,108,738, issued Sep. 19, 2006, both to Burns et al. These two patents disclose an apparatus for filtering a gas or liquid stream such as a natural gas stream. The apparatus includes a closed vessel having a longitudinally extending length, an initially open interior, an input port at one extent and an output port at an opposite extent thereof. A partition located within the vessel interior divides the vessel interior into a first stage and a second stage. At least one opening is provided in the partition. A filter element is disposed within the vessel to extend from within the first stage. The filter element is easily mounted or removed from the vessel by rotating a J-slot engagement surface on the element which mates with a post provided on a mounting structure provided on the vessel partition.

However, in spite of the above advancements that have been made in overall filtration vessel design, there still exists a need in art for apparatus and methods for filtration.

There also exists a need in the art for apparatus and methods for improvements that simplify the process of mounting and replacing filter elements within the filtration vessel, thereby decreasing the cost of vessel installation and maintenance.

As a non-limiting example of a desired improvement, for filtration systems as disclosed in U.S. Pat. Nos. 5,919,284, and 6,187,647, the portion of the filter element positioned in the downstream stage is generally a lot cleaner than the portion of the filter element positioned in the upstream stage. However, with these filtration systems, the entire filter element is removed and replaced, even though the downstream portion of the filter may be readily further used.

These and other needs in the art will become apparent to those of skill in the art upon review of this specification, including its drawings and claims.

SUMMARY OF THE INVENTION

It is an object of the present invention to provide for apparatus and methods for filtration.

It is another object of the present invention to provide for apparatus and methods for improvements that simplify the process of mounting and replacing filter elements within the filtration vessel, thereby decreasing the cost of vessel installation and maintenance.

It is even another object of the present invention to allow the use of different removal efficiencies of filter elements in the first and second stages based on the application and/or operator's requirements.

These and other objects of the present invention will become apparent to those of skill in the art upon review of this specification, including its drawings and claims.

According to one embodiment of the present invention there is provided an apparatus for filtering a gas. The apparatus may include a vessel having a partition dividing the vessel into a first stage and a second stage, wherein the partition defines an opening providing liquid communication between the stages. The apparatus also may include a filter element positioned in the opening comprising first member having a first connection end and a second member having a second connection end. This the first and second members may be connected by a connection system in which the first connection end and the second connection end form a mating pair to provide the connection, wherein at least a portion of the first member extends into the first stage, and at least a portion of the second member extends into the second stage, and wherein the first member is removable from the second member while the filter element is positioned in the opening.

According to another embodiment of the present invention, there is provided a method of operating a filtering apparatus. The filtering apparatus may comprise a vessel having a partition dividing the vessel into a first stage and a second stage, wherein the partition defines an opening providing liquid communication between the stages, and further comprises a filter element positioned in the opening comprising a first member having a first connection end and a second member having a second connection end, wherein the first and second members are connected by a connection system in which the first connection end and the second connection end form a mating pair to provide the connection, wherein at least a portion of the first member extends into the first stage, and at least a portion of the second member extends into the second stage. The method may include separating the first member from the second member, while the filter element is positioned in the opening, thereby leaving at least a portion of the second member extending into the second stage.

According to even another embodiment of the present invention, there is provided a method of operating a filtering apparatus. The filtering apparatus may comprise a vessel having a partition dividing the vessel into a first stage and a second stage, wherein the partition defines an opening providing liquid communication between the stages, and further comprises a filter element positioned in the opening comprising a first member having a first end and a second member having a second connection end, wherein the first and second members are connected by a connection system in which the first connection end and the second connection end engage to provide the connection, wherein at least a portion of the first member extends into the first stage, and at least a portion of the second member extends into the second stage. The method may include replacing the first member with a replacement member.

BRIEF DESCRIPTION OF THE DRAWINGS

The following drawings illustrate some of the many possible embodiments of this disclosure in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus, for a detailed understanding of this disclosure, reference should be made to the following detailed description, taken in conjunction with the accompanying drawings, in which like elements have been given like numerals.

DETAILED DESCRIPTION OF THE INVENTION

Figure 1:
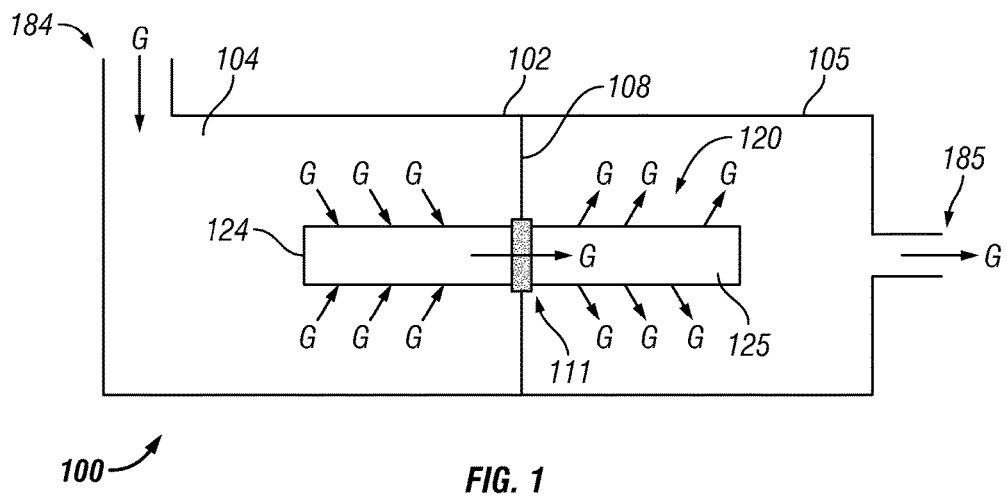
FIG. 1 is a schematic representation of one non-limiting embodiment of a filtration system of the present invention.

In one aspect, the present invention provides a filtration filter. In another aspect, the present invention provides a filtration system that includes the filtration filter positioned within a filtration vessel. Any suitable type of filtration vessel may be utilized in the practice of the present invention, including certain filtration vessels as disclosed in any of U.S. Pat. Nos. 5,919,284, 6,187,647, 7,014,685, and 7,108,738. Depending upon the situation and operating conditions, suitable filtration vessels may include multistage vessel 11 as shown in FIG. 1 of U.S. Pat. No. 6,187,647, and filter vessel 13 as shown in FIG. 1 of U.S. Pat. No. 7,014,685, with the understanding that vessels 11 and 13 will include the filtration filter as disclosed herein, and be adapted to receive such filter.

Referring now to FIG. 1, there is shown a schematic representation of one non-limiting embodiment 100 of the filtration system of the present invention. In very simple terms, the filtration system of the present invention may include a filtration vessel 102 having a first stage 104 and a second stage 105. A partition 108 positioned within filtration vessel 102 divides the volume of filtration vessel 102 into first stage 104 and second stage 105. The present invention anticipates that in some non-limiting embodiments, filtration vessel may comprise two vessels that are joined together, one vessel forming the first stage, and one vessel forming the second stage, with the abutted walls of each vessel serving as the partition, or perhaps the two vessels will share a common wall serving as the partition.

Partition 108 defines at least one passage 111 allowing for liquid communication between first stage 104 and second stage 105. Within each of passages 111 will reside a filtration filter 120. This filter 120 includes at least two distinct parts, first filtration member 124 and second filtration member 125. Filter member 120 may in some embodiments be a hollow core filtration filter. In some non-limiting embodiments, at least a portion of first filtration member 124 will extend into vessel first stage 104, and at least a portion of first member 124 will extend into vessel second stage 105. In some non-limiting embodiments, none of first filtration member 124 will extend into vessel second stage 105.

It should be understood that first filtration member 124 and second filtration member 125 may provide the same or different filtering, that is, the filtering characteristic of the first and second filtration members 124 and 125 may be the same or different. As a non-limiting example, first filtration member 124 may have a first filtering characteristic wherein it removes larger particles and allows smaller particles to be removed by filtration member 125 having a second filtering characteristic wherein it removed smaller pariticles. It should also be understood that when multiple filter members 120 are utilized, each of the multiple filter members 124 and 125 may be the same or different. As a non-limiting example, various same and/or different filter members 120 may be utilized based on the geometry of the arrangement of the filter members 120, based on the geometry of the vessel 102, and/or based on any other operating parameter or physical property of the material being filtered. It should also be understood that filter member 120 may also include multiple stages that align with multiple stages in a vessel 102. The filter member 120 may include mating pairs 130 at the interface of one or more or all of the interfaces between stages, which mating pairs 130 may be the same or different, and this filter member 120 may be disconnectable at one or more the mating pairs 130.

Filtration vessel 102 further includes an inlet port 184 in fluid communication with vessel first stage 104. Filtration vessel 102 even further includes an outlet port 185 in fluid communication with vessel second stage 105.

Gas flow, indicated by the "G" labeled arrows, is through inlet port 184 and into vessel first stage 104, through the filter wall of filter member 124, through the hollow core of filter member 124, into the hollow core of filter member 125, out through the wall of filter member 125, through the second stage 105, and finally exiting through outlet 185.

Figure 2:
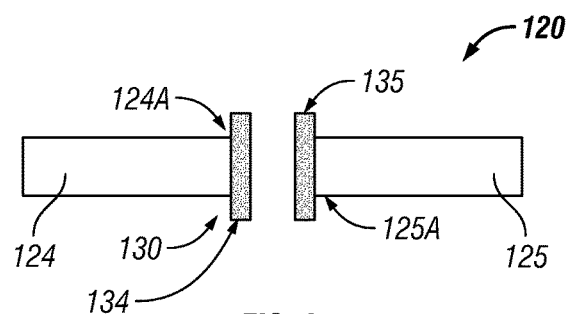
FIG. 2 is a schematic representation of a filter element of the present invention.

Referring additionally to FIG. 2, there is shown a schematic representation of filter element 120 of the present invention. Referring even additionally to FIGS. 3-10, there is illustrated various views of filter element 120 showing first member 124 and second member 125 in various states of connection. Filter member 124 and filter member 125 are joined by a mating pair 130 having a first pair member 134 at end 124A of filter member 124, and a second pair member 135 at end 125A of filter member 125. In some embodiments, the mating pair 130 will comprise male and female connector members. It should be understood that first pair member 134 may comprise either a male or female connector member, with second pair member 135 comprising the complimentary mating female or male connector member. In most embodiments, a female-male arrangement for the first and second pair members 134 and 135 will be considered equivalent to a male-female arrangement. This mating pair 130 must sufficiently join filter member 124 and 125 together so as to endure the hardships of the filtration operation, but must allow disconnecting of filter member 124 to allow for removal of such filter member 124. As non-limiting examples, mating pair 130 may connect by snapping, bolting, friction fitting, interlocking, engaging, coupling, hook/looping, adhering, adhesion with a time released adhesive, adhesion with a solvent releasing adhesive, magnetic coupling, locking, threadably engaging, and the like.

Figure 3:
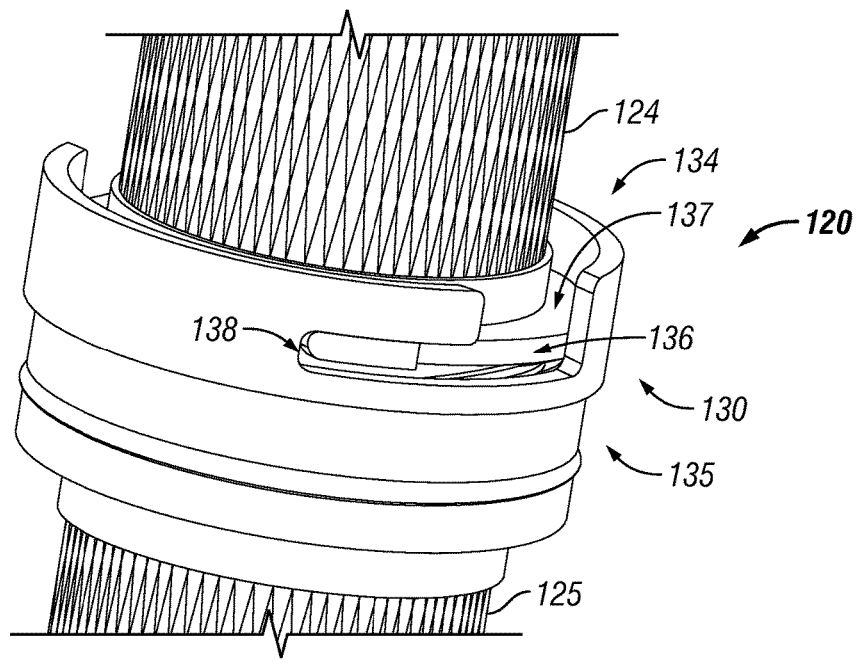
FIG. 3 shows engaging member 139 of first filter member 124 resides in slot 136 of second filter member 125.

In FIG. 3, engaging member 139 of first filter member 124 resides in slot 136 of second filter member 125. As shown, engaging member 139 resides in end 138 of slot 136. Generally, twisting/untwisting of members 124 and 125 relative to each other would lock engaging member 139 in place at end 138 or could move it toward slot opening 137 for disengagement. As a non-limiting embodiment, end 138 of slot 136 may be shaped (for example tapered) to provide a friction fit of engaging member 139, or the surfaces of slot 136 at end 138 may be textured/roughened to engage textured/roughened surfaces of engaging member 139. Untwisting them will reverse the process and allow for the members to be separated.

Figure 4:
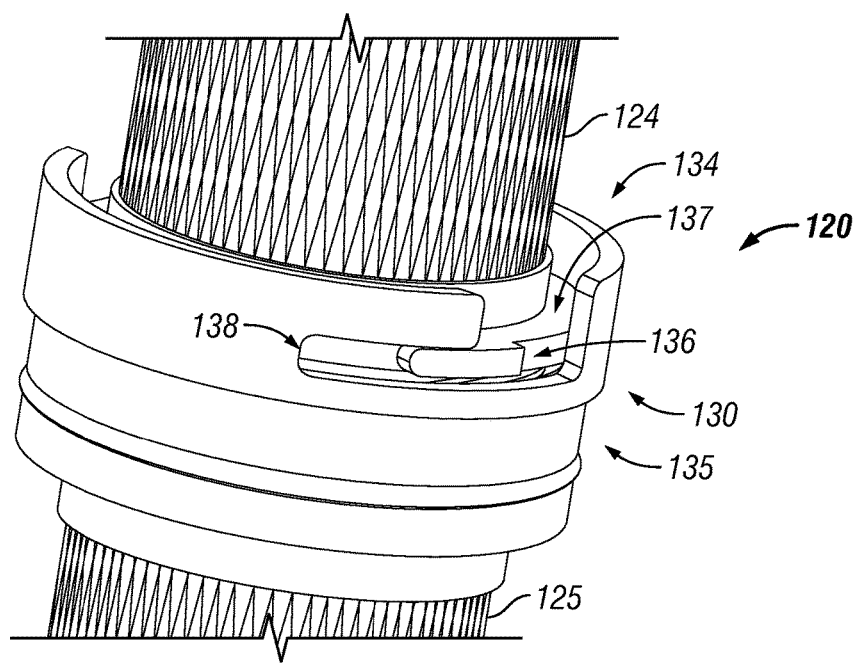
FIG. 4 shows first filter member 124 and second member 125 have been twisted relative to each other to allow engaging member 139 to move in slot 136 toward slot opening 137 to allow for disengagement.

Referring now to FIG. 4, first filter member 124 and second member 125 have been twisted relative to each other to allow engaging member 139 to move in slot 136 toward slot opening 137 to allow for disengagement.

Figure 5:
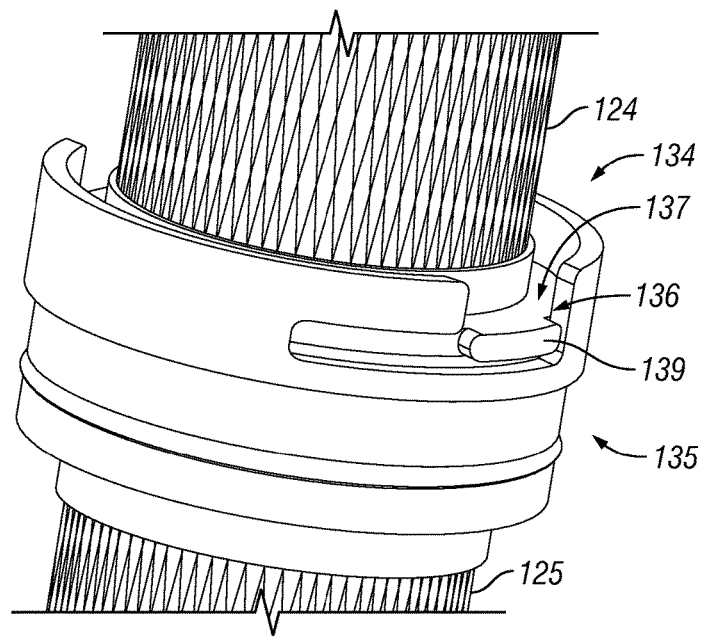
FIG. 5 shows first filter member 124 and second member 125 have been further twisted relative to each other, such that engaging member 139 is shown aligned in slot opening 137 to allow for disengagement.

Referring now to FIG. 5, first filter member 124 and second member 125 have been further twisted relative to each other, such that engaging member 139 is shown aligned in slot opening 137 to allow for disengagement.

Figure 6:
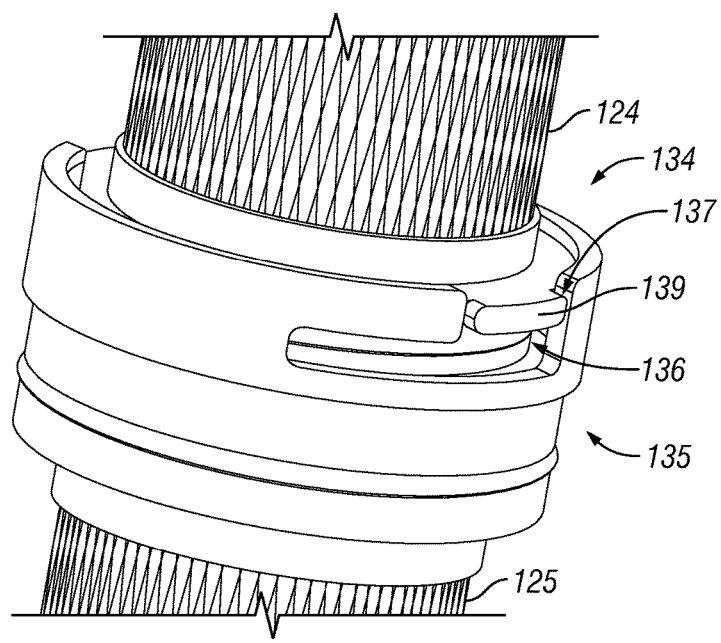
FIG. 6 shows first filter member 124 and second member 125 have been moved away from each other, such that engaging member 139 is shown moving though slot opening 137 to allow for disengagement.

Referring now to FIG. 6, first filter member 124 and second member 125 have been moved away from each other, such that engaging member 139 is shown moving though slot opening 137 to allow for disengagement.

Figure 7:
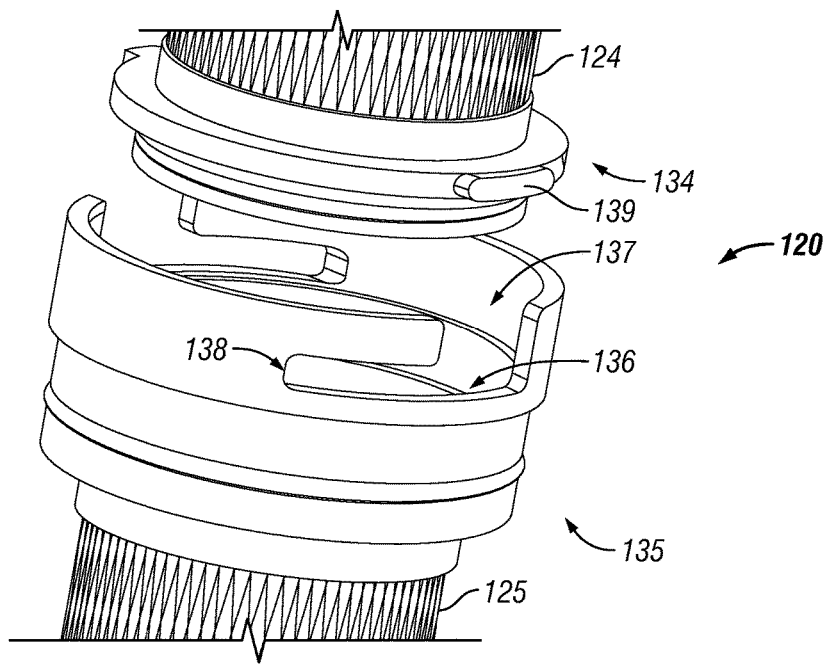
FIG. 7 shows first filter member 124 and second member 125 have been moved away from each other, such that engaging member 139 is shown moved completely through slot opening 137 and filter members 124 and 125 are disengaged.

Referring now to FIG. 7, first filter member 124 and second member 125 have been moved away from each other, such that engaging member 139 is shown moved completely through slot opening 137 and filter members 124 and 125 are disengaged.

Figure 8:
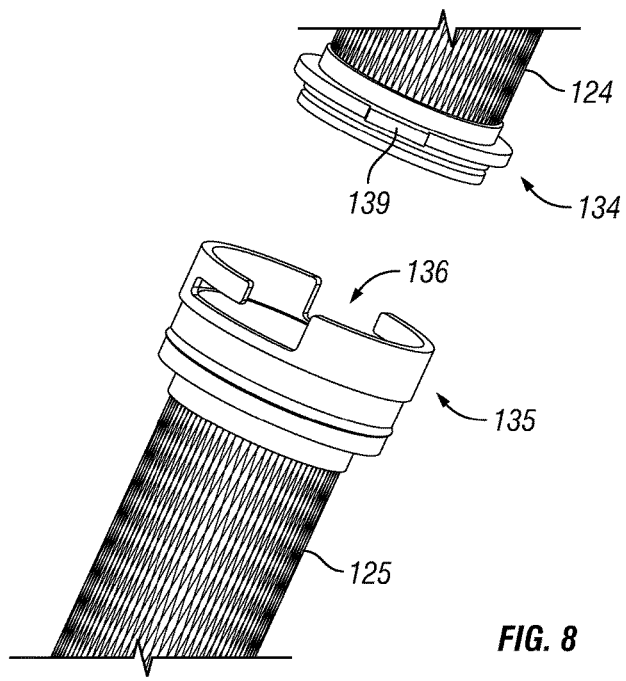
FIGS. 8-10 show slightly different views of filter 120, showing filter members 124 and 125 disengaged.
Figure 9:
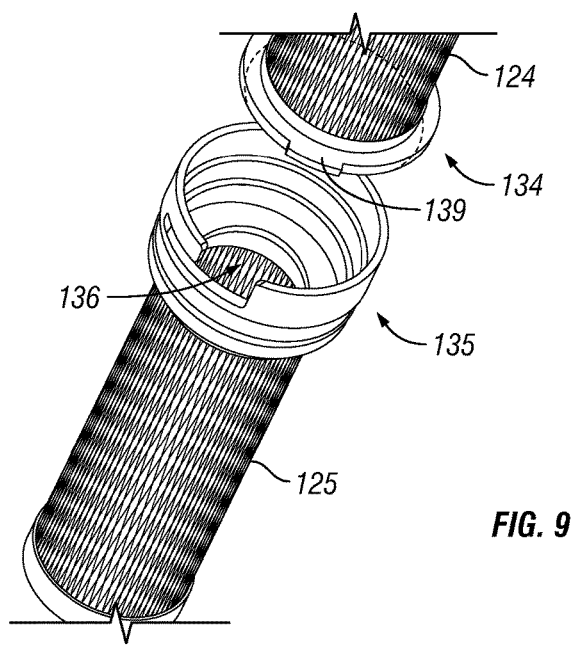
Figure 10:
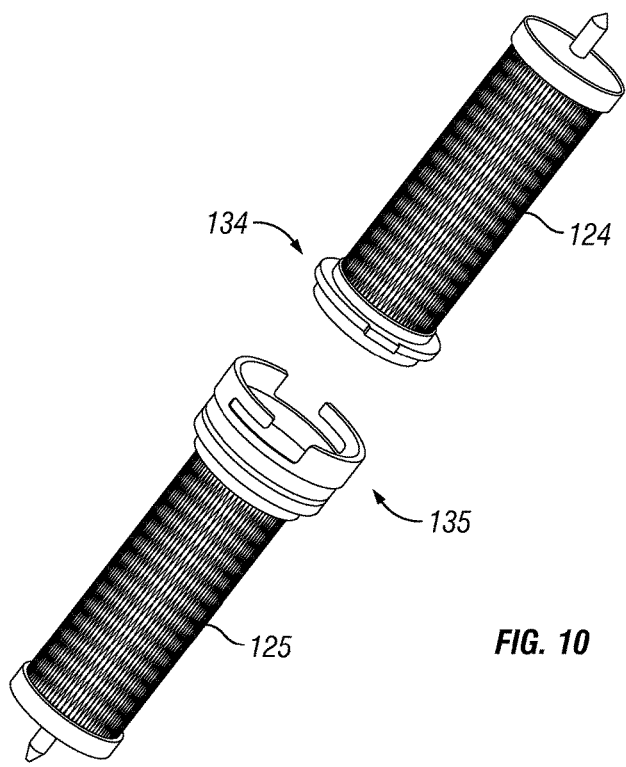

FIGS. 8-10 show slightly different views of filter 120, showing filter members 124 and 125 disengaged.

In methods of the present invention, with filter element positioned within a filter vessel 102, filter member 124 may be separated from filter member 125, removed from vessel 102, and then replaced with a new filter member.

All of the patents and applications cited in this specification, are herein incorporated by reference.

It should be understood that while the present invention has been illustrated mainly by reference to filtration of a gas stream, it finds utility in the filtration of gas streams, liquid streams, and gas/liquid streams.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

The invention claimed is:

1. An apparatus for filtering a gas comprising
   a vessel defining a volume, said vessel having a partition dividing the volume of the vessel into an upstream first stage and a downstream second stage, wherein the partition defines an opening providing liquid communication between the stages; and, a filter element positioned completely in the vessel in the first stage, the second stage and in the opening, the filter element comprising a first member having a first connection end and a first filtering characteristic, and a second member having a second connection end and a second filtering characteristic, wherein the first and second members are connected by a connection system in which the first connection end and the second connection end form a mating pair to provide the connection, wherein at least a portion of the first member extends into the first stage, and at least a portion of the second member is positioned in the first stage and extends through the opening and into the second stage, wherein the first member is removable from the second member while the second member remains positioned in the first stage extending through the opening and positioned in the second stage, and wherein the first filtering characteristic and the second filtering characteristic are the same or different.

2. The apparatus of claim 1, wherein the first and second connection ends form a mating pair by at least one of snapping, bolting, friction fitting, interlocking, engaging, coupling, hook/looping, adhering, adhesion with a time released adhesive, adhesion with a solvent releasing adhesive, magnetic coupling, locking, and threadably engaging.

3. The apparatus of claim 1, further comprising a replacement member for the first member.

4. The apparatus of claim 1, wherein the first connection end and the second connection end comprise an engaging member and a slot adapted to receive the engaging member.

5. The apparatus of claim 1, wherein the first filtering characteristic and the second filtering characteristic are different.

6. An apparatus for filtering a gas comprising
a vessel defining a volume, said vessel having a partition dividing the volume of the vessel into an upstream first stage and a downstream second stage, said vessel defining a gas entry into the vessel at the first stage and defining a gas exit from the vessel at the second stage, wherein the partition defines an opening providing liquid communication between the stages; and,
a filter element positioned completely in the vessel in the first stage, the second stage and in the opening, the filter element comprising a first member having a first connection end and a first filtering characteristic, and a second member having a second connection end and a second filtering characteristic, wherein the first and second members are connected by a connection system in which the first connection end and the second connection end form a mating pair to provide the connection, wherein at least a portion of the first member extends into the first stage, and at least a portion of the second member is positioned in the first stage and extends through the opening and into the second stage, wherein the first member is removable from the second member while the second member remains positioned in the first stage extending through the opening and positioned in the second stage, and wherein the first filtering characteristic and the second filtering characteristic are the same or different.

7. The apparatus of claim 6, wherein the first and second connection ends form a mating pair by at least one of snapping, bolting, friction fitting, interlocking, engaging, coupling, hook/looping, adhering, adhesion with a time released adhesive, adhesion with a solvent releasing adhesive, magnetic coupling, locking, and threadably engaging.

8. The apparatus of claim 6, further comprising a replacement member for the first member.

9. The apparatus of claim 6, wherein the first connection end and the second connection end comprise an engaging member and a slot adapted to receive the engaging member.

10. The apparatus of claim 6, wherein the first filtering characteristic and the second filtering characteristic are different.

11. An apparatus for filtering a gas comprising
a vessel defining a volume, said vessel having a partition dividing the volume of the vessel into an upstream first stage and a downstream second stage, wherein the partition defines an opening providing liquid communication between the stages; and,
a filter element positioned completely in the vessel in the first stage, the second stage and in the opening, the filter element comprising a first member, having a first exterior, a first interior, a first connection end and a first filtering characteristic, and a second member having a second exterior, a second interior, a second connection end and a second filtering characteristic, wherein the first and second members are connected by a connection system in which the first connection end and the second connection end form a mating pair to provide the connection, wherein at least a portion of the first member extends into the first stage, and at least a portion of the second member is positioned in the first stage and extends through the opening and into the second stage, wherein the first member is removable from the second member while the second member remains positioned in the first stage extending through the opening and positioned in the second stage, and wherein the first filtering characteristic and the second filtering characteristic are the same or different;
wherein a flow path is defined as entering the vessel directly at the first stage, passing from the first exterior to the first interior, passing into the second stage into the second interior, passing from the second interior to the second exterior, and then exiting the vessel directly from the second stage.

12. The apparatus of claim 11, wherein the first and second connection ends form a mating pair by at least one of snapping, bolting, friction fitting, interlocking, engaging, coupling, hook/looping, adhering, adhesion with a time released adhesive, adhesion with a solvent releasing adhesive, magnetic coupling, locking, and threadably engaging.

13. The apparatus of claim 11, further comprising a replacement member for the first member.

14. The apparatus of claim 11, wherein the first connection end and the second connection end comprise an engaging member and a slot adapted to receive the engaging member.

15. The apparatus of claim 11, wherein the first filtering characteristic and the second filtering characteristic are different.

* * * * *